(12) United States Patent
Huang

(10) Patent No.: US 8,902,777 B1
(45) Date of Patent: Dec. 2, 2014

(54) METHODS AND APPARATUS FOR SELF-TUNING AGGREGATION OF DATA UNITS

(75) Inventor: Liang-Jong Huang, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 171 days.

(21) Appl. No.: 13/538,042

(22) Filed: Jun. 29, 2012

(51) Int. Cl.
*H04L 1/00* (2006.01)
*H04L 12/26* (2006.01)
*H04L 12/28* (2006.01)
*H04W 4/00* (2009.01)

(52) U.S. Cl.
USPC .......................... 370/252; 370/254; 370/328

(58) Field of Classification Search
CPC ......... H04L 47/10; H04L 43/50; H04L 41/12; H04L 45/02; H04W 80/04; H04W 88/06
USPC ......................................... 370/252, 254, 328
See application file for complete search history.

(56) References Cited

U.S. PATENT DOCUMENTS

| 2002/0015453 A1* | 2/2002 | Lamacraft ..................... 375/316 |
| 2003/0210681 A1* | 11/2003 | Sumi et al. ..................... 370/352 |
| 2009/0201898 A1* | 8/2009 | Gong et al. ..................... 370/338 |

* cited by examiner

*Primary Examiner* — Ronald Abelson
(74) *Attorney, Agent, or Firm* — Cooley LLP

(57) ABSTRACT

In some embodiments, an apparatus includes an access point (AP) wirelessly coupled to a set of mobile communication devices. The AP is configured to determine a set of weights for a set of metrics based on a performance goal collectively associated with the AP and the set of mobile communication devices. The AP is configured to define, for each mobile communication device from the set of mobile communication devices, a maximum aggregation data unit size, a minimum aggregation data unit count, and a maximum aggregation data unit count based on the set of weights and a set of values for the set of metrics. The AP is configured to send, to each mobile communication device from the set of mobile communication devices, a signal based on the maximum aggregation data unit size, the minimum aggregation data unit count and the maximum aggregation data unit count.

20 Claims, 4 Drawing Sheets

METHODS AND APPARATUS FOR SELF-TUNING AGGREGATION OF DATA UNITS

BACKGROUND

Some embodiments described herein relate generally to aggregation of data units at access points, and, in particular, to methods and apparatus for self-tuning aggregation of data units at access points.

Some known aggregation approaches aggregate as many queued data units as possible during a time period for data transmissions between an access point and associated stations. Such known aggregation approaches, however, typically do not wait for the opportunity to aggregate more data units when the queued data units are few within the time period. As a result, the performance and channel utilization for these known aggregation approaches can be poor due to collision avoidance characteristics and transmission overhead associated with the aggregation.

Some other known aggregation approaches aggregate data units only when a minimum number of data units are queued for a data transmission between an access point and an associated station. Such known aggregation approaches can also implement a time-out mechanism to avoid long latency. Choosing a reasonable and effective criterion for the minimum number of queued data units and the time-out threshold, however, is typically difficult. Moreover, the chosen criterion is typically fixed and cannot be suitable for every station under every operating condition. As a result, the performance and service quality for some associated stations and services under some operating conditions may be degraded.

Accordingly, a need exists for a data unit aggregation approach that enables dynamic tuning of the aggregation setting for each associated station and under different operating conditions to provide better service, performance, and/or channel utilization for data transmissions.

SUMMARY

In some embodiments, an apparatus includes an access point (AP) wirelessly coupled to a set of mobile communication devices. The AP is configured to determine a set of weights for a set of metrics based on a performance goal collectively associated with the AP and the set of mobile communication devices. The AP is configured to define, for each mobile communication device from the set of mobile communication devices, a maximum aggregation data unit size, a minimum aggregation data unit count, and a maximum aggregation data unit count based on the set of weights and a set of values for the set of metrics. The AP is configured to send, to each mobile communication device from the set of mobile communication devices, a signal based on the maximum aggregation data unit size, the minimum aggregation data unit count and the maximum aggregation data unit count.

DETAILED DESCRIPTION

In some embodiments, an apparatus includes an access point (AP) configured to be wirelessly coupled to a set of mobile communication devices. The AP is configured to send to or receive from one mobile communication device from the set of mobile communication devices during a time period and not send to or receive from the remaining mobile communication devices from the set of mobile communication devices.

The AP is configured to determine a set of weights for a set of metrics based on a performance goal collectively associated with the AP and the set of mobile communication devices. In some embodiments, the set of metrics include at least one of a link rate for a mobile communication device from the set of communication devices, an ingress data unit rate at the AP associated with a communication device from the set of communication devices, a service load for the set of communication devices, a service type of a data unit sent from or received by the AP, a service quality of a data unit sent from or received by the AP, a number of available block acknowledgment slots, or a resource availability for a mobile communication device from the set of mobile communication devices.

The AP is configured to define, for each mobile communication device from the set of mobile communication devices, a maximum aggregation data unit size, a minimum aggregation data unit count, and a maximum aggregation data unit count based on the set of weights and a set of values for the set of metrics. The AP is further configured to send, to each mobile communication device from the set of mobile communication devices, a signal based on the maximum aggregation data unit size, the minimum aggregation data unit count and the maximum aggregation data unit count. In some embodiments, the AP is configured to send the signal such that each mobile communication device from the set of mobile communication devices receives from the AP according to the 802.11n protocol based on the maximum aggregation data unit size, the minimum aggregation data unit count and the maximum aggregation data unit count.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

As used herein, the singular forms "a," "an" and "the" include plural referents unless the context clearly dictates otherwise. Thus, for example, the term "an access point" is intended to mean a single wireless access device or a combination of wireless access devices (e.g., devices associated with a wireless-access function).

Figure 1:
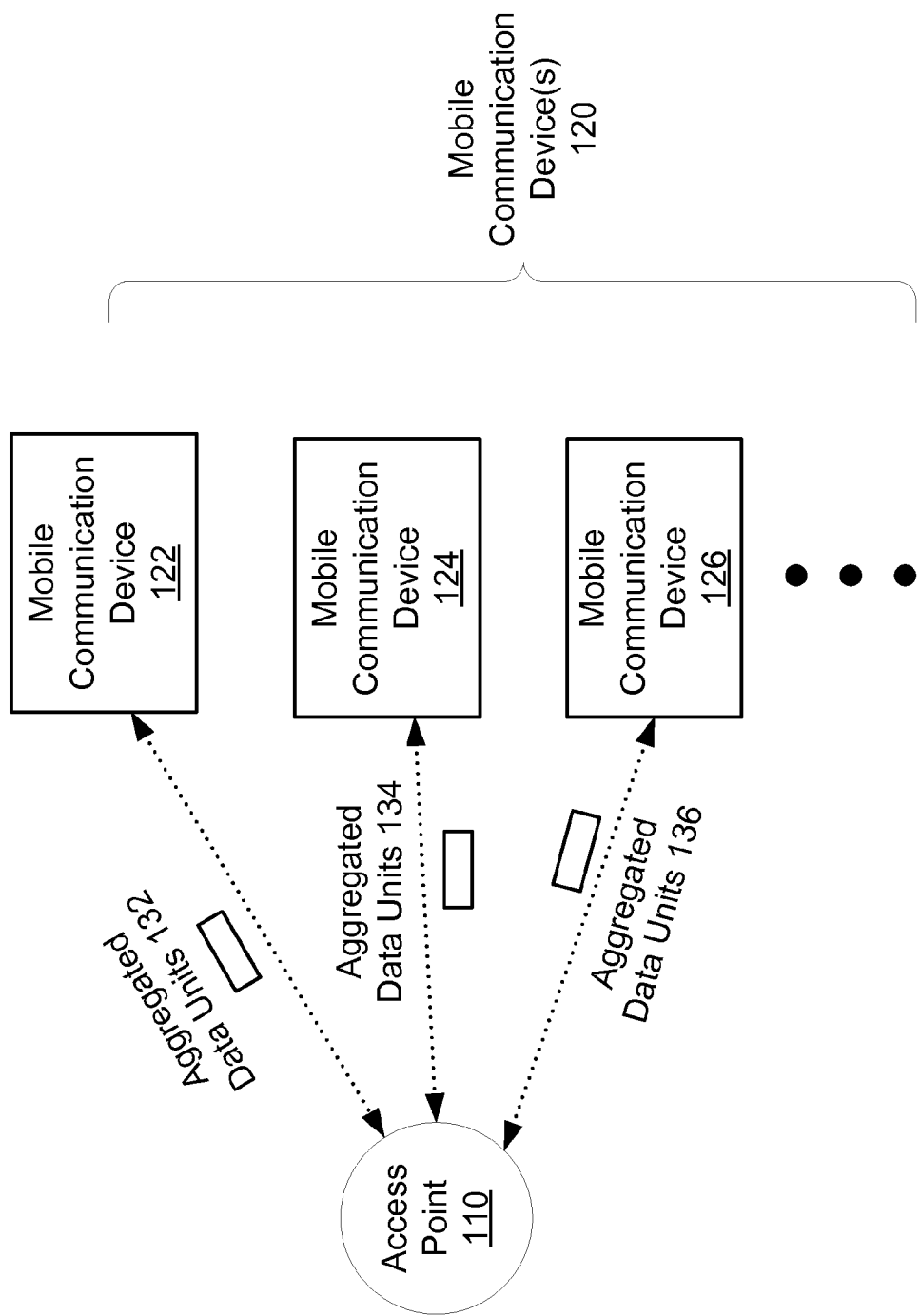
FIG. 1 is a schematic illustration of an access point configured to communicate with mobile communication devices, according to an embodiment.

FIG. 1 is a schematic illustration of an access point 110 configured to communicate with one or more mobile communication devices 120, according to an embodiment. In some embodiments, the access point 110 can be wirelessly coupled to and communicate with a single mobile communication device 120. In other embodiments, as shown in FIG. 1, the access point 110 can be wirelessly coupled to and communicate with multiple mobile communication devices 120 (e.g., mobile communication devices 122, 124, and 126).

The access point 110 can be any device configured to be wirelessly coupled to and communicate with one or more mobile communication devices 120. In some embodiments, the access point 110 can be, for example, a computer device, a mobile device, a server device, a workstation, an access device, and/or the like. In some embodiments, the access point 110 can be included in a wireless network (not shown in FIG. 1) such as, for example, a wireless local area network (WLAN), a mobile device network (e.g., a global system for mobile communications (GSM) network, a personal communications service (PCS) network), a wide area network (WAN), a Wi-Fi network, a wireless mesh network (WMN), a radio access network (RAN), and/or the like. In such embodiments, the access point 110 can be configured to operatively couple other devices of the wireless network with the mobile communication device(s) 120. As a result, other devices of the wireless network can transmit data (e.g., data packets, data units, data frames) to and/or receive data from the mobile communication device(s) 120 via the access point 110. Similarly stated, the access point 110 can function as a relay in data transmissions between other devices of the wireless network and the mobile communication device(s) 120.

In some embodiments, the access point 110 can be configured to operate at certain frequencies in data transmissions with the mobile communication device(s) 120. In some embodiments, the access point 110 can have one or more transceivers (e.g., radios) configured to operate within the RF (radio frequency) frequency range (i.e., about 3 kHz to 300 GHz). In some other embodiments, the access point 110 can have one or more transceivers or any other suitable communication devices configured to operate at any other frequencies.

In some embodiments, the access point 110 can operate data transmission (and reception) with each mobile communication device 120 (e.g., the mobile communication devices 122, 124 and 126) on a distinct or separate frequency channel (uniquely associated with a frequency channel). That is, the access point 110 can transmit (and receive) data with each mobile communication device 120 on a frequency channel that is mutually exclusive of the frequency channel(s) for other mobile communication device(s) 120. In such embodiments, the access point 110 typically has more than one radio, transceiver, or any other suitable communication device such that the access point 110 can transmit data with multiple mobile communication devices 120 simultaneously on multiple mutually exclusive frequency channels.

In some other embodiments, the access point 110 can operate data transmission (and reception) with multiple mobile communication devices 120 on one or more common frequency channels. That is, the access point 110 can transmit data with each mobile communication device 120 on any of the common frequency channel(s). In such embodiments, data transmission between the access point 110 and a mobile communication device 120 (e.g., the mobile communication device 122) can potentially interfere with data transmission between the access point 110 and the remaining mobile communication device(s) 120 (e.g., the communication devices 124, 126). In such embodiments, the multiple mobile communication devices 120 compete with each other for using the shared medium (i.e., the common frequency channel(s)) to transmit data with the access point 110. As a result, in some embodiments, a wireless network multiple access method (e.g., the IEEE (Institute of Electrical and Electronics Engineers) 802.11a, 802.11g, 802.11n protocols) can be applied at the access point 110 and the mobile communication devices 120 to manage data transmissions between the access point 110 and the mobile communication devices 120. In such embodiments, the wireless network multiple access method can include features such as, for example, collision avoidance, collision detection, retransmission mechanism, etc.

In some embodiments, the access point 110 can be configured to communicate with at most a single mobile communication device 120 at any given time. That is, the access point 110 can be configured to send to or receive from only one mobile communication device 120 during a time period, and not send to or receive from the remaining mobile communication device(s) 120 at the same time. In other embodiments, the access point 110 can be configured to simultaneously communicate with (e.g., send to, receive from) multiple mobile communication devices 120 over one or more radio frequencies. For example, the access point 110 and the mobile communication devices 120 can implement IEEE 802.11ac multi-user MIMO (multiple input and multiple output) to enable the simultaneous multi-user communications between the access point 110 and multiple mobile communication devices 120.

The mobile communication devices 120 can be any device configured to be wirelessly coupled to and communicate with the access point 110. Thus, the mobile communication devices 120 can be operatively coupled to and communicate with other devices of the wireless network using the access point 110 as a relay. In some embodiments, the mobile communication devices 120 can be, for example, cellular phones, Wi-Fi enabled laptops, Bluetooth devices, mobile devices, tablets, and/or the like. In some embodiments, the mobile communication devices 120 (e.g., the mobile communication devices 122, 124 and 126) can be the same type of device. For example, the mobile communication devices 122, 124 and 126 can all be Wi-Fi enabled laptops operatively coupled to a Wi-Fi network that includes the access point 110. In other embodiments, the mobile communication devices 120 can be various types of devices. For example, the mobile communication devices 122, 124 and 126 can be a smart phone, a tablet, a Wi-Fi enabled television, respectively, that are operatively coupled to a Wi-Fi network that includes the access point 110.

In some embodiments, multiple data units intended to be transmitted between the access point 110 and a mobile communication device 120 can be transmitted in an aggregated form, i.e., an aggregated data unit. In such embodiments, instead of separately transmitting each data unit that is queued at the access point 110 or the mobile communication device 120, multiple queued data units are aggregated to form an aggregated data unit, and the aggregated data unit is transmitted from the access point 110 to the mobile communication device 120 or from the mobile communication device 120 to the access point 110. After the aggregated data unit is received at the mobile communication device 120 or the access point 110, the original data units can be extracted from the aggregated data unit. For example, the access point 110 can be configured to send aggregated data units 132 to and/or receive aggregated data units 132 from the mobile communication device 122; the access point 110 can be configured to send aggregated data units 134 to and/or receive aggregated data units 134 from the mobile communication device 124; the access point 110 can be configured to send aggregated data units 136 to and/or receive aggregated data units 136 from the mobile communication device 126.

In some embodiments, each of various types of data units can be aggregated in a layer of a communication protocol stack associated with that type of data units (e.g., data link layer or network layer of the Open Systems Interconnection (OSI) model). In some embodiments, multiple data frames can be aggregated into one large data frame at the MAC (media access control) layer (layer 2) in the OSI model. For example, MAC service data units (MSDU) to be transmitted between the access point 110 and a mobile communication device 120 can be aggregated into a single 802.11n frame. Such a frame aggregation is known as MSDU aggregation. For another example, MAC protocol data units (MPDU) to be transmitted between the access point 110 and a mobile communication device 120 can be aggregated into a single 802.11n frame. Such a frame aggregation is known as MPDU aggregation. Additionally, in some other embodiments, multiple data packets can be aggregated into one large data packet at, for example, the network layer (layer 3) of the OSI model.

In some embodiments, aggregation of data units can be operated based on a standard such as, for example, the IEEE 802.11n protocol. In such embodiments, data units are typically aggregated based on one or more parameters of an aggregation setting defined by the standard. In the example of FIG. 1, values for the parameters of the aggregation setting can be determined at the access point 110. Thus, the aggregation of data units can be operated according to the determined parameter values at the access point 110 before aggregated data units are sent from the access point 110 to the associated mobile communication device 120 (e.g., the mobile communication device 122, 124 or 126). Furthermore, in some embodiments, the determined parameter values can be sent from the access point 110 to the associated mobile communication device 120 via a signal (not shown in FIG. 1). As a result, aggregation of data units can be operated according to the determined parameter values at the associated mobile communication device 120 before aggregated data units are sent from the associated mobile communication device 120 to the access point 110. Details of data unit aggregation are further described with respect to FIGS. 2 and 3.

Figure 2:
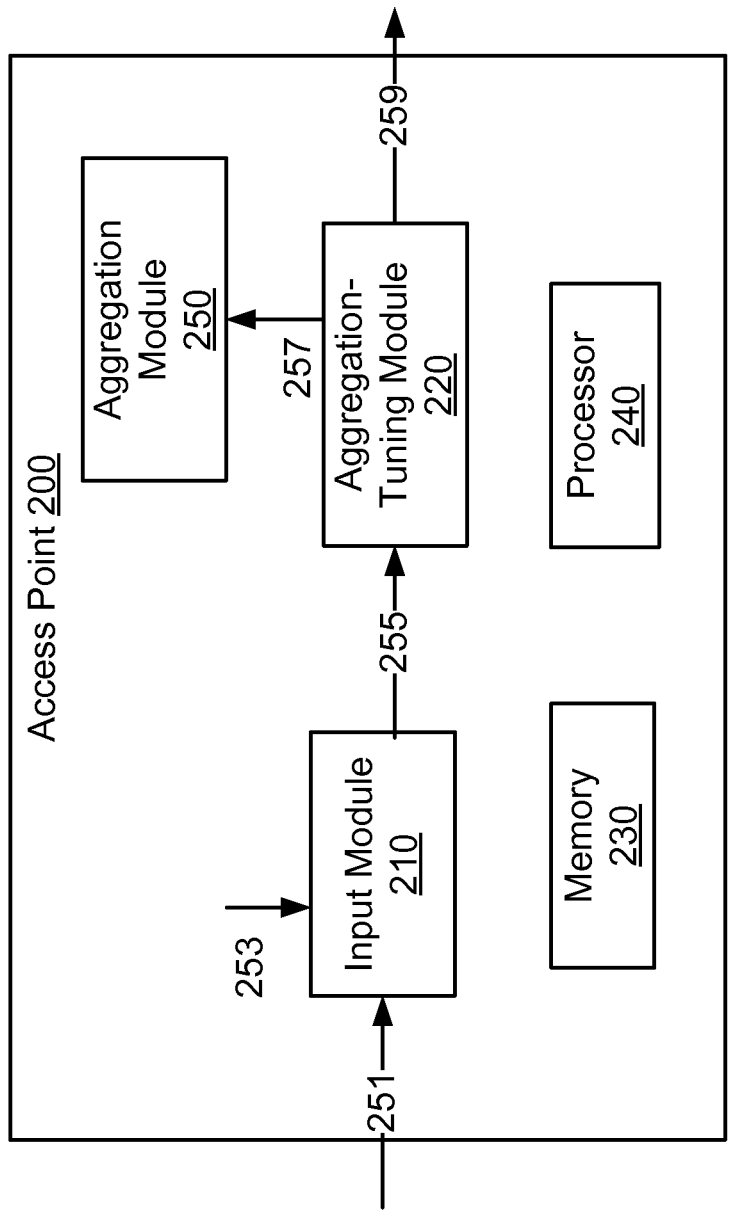
FIG. 2 is a block diagram of an access point, according to an embodiment.

FIG. 2 is a block diagram of an access point 200, according to an embodiment. The access point 200 can be structurally and functionally similar to the access point 110 shown and described with respect to FIG. 1. Although not shown in FIG. 2, the access point 200 can be included in a wireless network and operatively coupled to one or more mobile communication devices that are similar to the mobile communication devices 120 in FIG. 1. As shown in FIG. 2, the access point 200 includes an input module 210, an aggregation-tuning module 220, an aggregation module 250, a memory 230, and a processor 240. The access point 200 can include more components and/or modules than those shown in FIG. 2. For example, the access point 200 can include a radio circuit module and an antenna. In some embodiments, the access point 200 can be a single physical device. In other embodiments, the access point 200 can comprise multiple physical devices, each of which includes one or more modules and/or components of the access point 200 (some of which may not be shown in FIG. 2).

Each module or component in the access point 200 is operatively coupled to each remaining module or component. Each module (e.g., the input module 210, the aggregation-tuning module 220, the aggregation module 250) in the access point 200 can be any combination of hardware and/or software (stored and/or executing in hardware) capable of performing one or more specific functions associated with that module. In some embodiments, each module in the access point 200 can include, for example, a field-programmable gate array (FPGA), an application specific integrated circuit (ASIC), a digital signal processor (DSP), and/or the like.

The memory 230 can be, for example, a random-access memory (RAM) (e.g., a dynamic RAM, a static RAM), a flash memory, a removable memory, and/or so forth. In some embodiments, the memory 230 can include and/or store, for example, a database(s), process(es), application(s), a set(s) of instructions, virtual machine(s), and/or some other software modules (stored and/or executing in hardware) or hardware modules configured to execute a self-tuning process associated with data unit aggregation. In such embodiments, instructions of executing the self-tuning process and/or associated methods can be stored within the memory 230 and executed at the processor 240.

The processor 240 can be configured to, for example, write data into and read data from the memory 230, and execute the instructions stored within the memory 230. The processor 240 can also be configured to control, for example, the operations of the modules within the access point 200, including the input module 210 and the aggregation-tuning module 220. In some embodiments, under the control of the processor 240 and based on the methods, instructions or processes stored within the memory 230, the input module 210 and the aggregation-tuning module 220 can be configured to collectively execute the self-tuning process associated with aggregating data units for data transmissions between the access point 200 and the associated mobile communication device(s), as described in further details below.

In operation, the input module 210 can be configured to receive information and/or data associated with the self-tuning process. The data received at the input module 210 can include values for a set of metrics associated with the self-tuning process. Such metrics can include, for example, information associated with medium availability (e.g., overall traffic condition, interference, etc.), a link rate associated with each mobile communication device, an ingress data unit rate associated with each mobile communication device, a type of each service (i.e., class of service (COS)), a service load (e.g., a number of services and/or associated mobile communication devices), a service quality (performance, retransmission rate, latency, etc.) of each service, a number of available block acknowledgement (ACK) slots, a resource availability (e.g., storage resource availability, processing resource availability) for each mobile communication device, a data unit error rate associated with each mobile communication device, and/or the like.

In some embodiments, some of the values for the set of metrics can be received at the input module 210 from an external device or personnel user device (e.g., a device used by a network administrator or a network operator) that is not part of the access point 200, via a signal 251 as shown in FIG. 2. For example, information associated with available resources for a shared global network domain can be received at the input module 210 from an external device (e.g., a mobile communication device) associated with that shared global network domain via the signal 251.

In some other embodiments, some of the values for the set of metrics can be received at the input module 210 from another module or component (not shown in FIG. 2) of the access point 200, via a signal 253 as shown in FIG. 2. For example, a value of an ingress data unit rate can be received at the input module 210 from a module (not shown in FIG. 2) of the access point 200 that is responsible of receiving data units, via the signal 253. For another example, a type of service, a service load and/or a service quality associated with a service provided by the access point 200 to a mobile communication device can be received at the input module 210 from a module (not shown in FIG. 2) of the access point 200 that is responsible of providing that service, via the signal 253. For yet another example, information associated with resource availability or a data unit error rate for a mobile communication device can be received at the input module 210 from a module (not shown in FIG. 2) of the access point 200 that is responsible of providing that information, via the signal 253.

In some embodiments, information associated with a goal of data unit aggregation can be received at the input module 210. The goal of data unit aggregation can be, for example, to enhance fairness among multiple mobile communication devices and/or various services; to improve overall throughput of data transmitted from and/or received at the access point 200; to maximize performance of a particular mobile communication device or service; etc. In some embodiments, such a goal of data unit aggregation can be entered or selected by an operator of the access point 200 (e.g., a network administrator, a user, etc.). In other embodiments, the access point 200 can be configured to automatically determine a goal for data unit aggregation.

In some embodiments, a set of weights can be determined for the set of metrics at the input module 210. Specifically, each metric from the set of metrics can be assigned a weight, which indicates the importance or priority of that metric with respect to the self-tuning process. Generally, a metric with a higher weight indicates a higher level of importance or more priority than a metric with a lower weight. In some embodiments, the weights for the set of metrics can be determined based on the goal of data unit aggregation that is received at the input module 210 by using, for example, a method, a process or a function. For example, a set of weights for the set of metrics can be pre-defined (e.g., during execution of a method or process) at the input module 210 for each goal of data unit aggregation. Thus, in response to receiving a first goal of data unit aggregation, the input module 210 can be configured to assign the set of weights pre-defined for the first goal of data unit aggregation to the set of metrics. After receiving a second goal of data unit aggregation, the input module 210 can be configured to modify the set of weights accordingly such that the set of weights pre-defined for the second goal of data unit aggregation are assigned to the set of metrics. In instances where a combination of goals of data unit aggregation is received, the input module 210 can be configured to assign a combination of a set of weights pre-defined for each goal of data unit aggregation.

After values for the set of metrics are received and the weights for the set of metrics are determined at the input module 210, the input module 210 can be configured to send the metric values and the weights to the aggregation-tuning module 220, via a signal 255 as shown in FIG. 2. The aggregation-tuning module 220 can be configured to determine, based on the received metric values and weights, one or more parameters of an aggregation setting for the data transmissions between the access point 200 and each mobile communication device. In some embodiments, the parameter(s) of an aggregation setting are specifically associated with each mobile communication device. For example, the aggregation-tuning module 220 can be configured to determine a set of parameters of an aggregation setting for data transmissions between the access point 200 and a first mobile communication device; and determine a different set of parameters of another aggregation setting for data transmissions between the access point 200 and a second mobile communication device.

In some embodiments, the parameters that are determined at the aggregation-tuning module 220 based on the values and weights for the set of metrics can include, for example, a maximum aggregation data unit size (e.g., in bits), a minimum aggregation data unit size, a maximum aggregation data unit count (e.g., in number of frames), a minimum aggregation data unit count, and/or the like. In some embodiments, any other parameter such as a maximum transmission time can also be determined at the aggregation-tuning module 220.

In some embodiments, the aggregation-tuning module 220 can implement a function, set of instructions, or process (es) to determine the parameters of an aggregation setting. In such embodiments, the values and weights for the set of metrics can be used as inputs to the function, set of instructions or process(es), and the corresponding outputs are determined values for the parameters of the aggregation setting. Additionally, in some embodiments, a time-out mechanism can be used at the aggregation-tuning module to limit the time for forming an aggregated data unit. For example, the time-out mechanism can be used to determine the maximum transmission time for the aggregation setting.

In some embodiments, the aggregation-tuning module 220 can be configured to determine parameters associated with a minimum aggregation requirement. Such parameters can include, for example, a timeout (e.g., a preset value associated with a latency requirement for each class of service (COS)), a minimum aggregation data unit count, a minimum aggregation time, etc. The minimum aggregation requirement can be implemented in one of several possible approaches (e.g., to determine when to stop aggregation). For example, in a count (or size)-based approach, data units are aggregated until 1) a minimum aggregation data unit count is satisfied and no more data units remain in the queue; 2) a maximum aggregation threshold (e.g., a maximum aggregation data unit size, a maximum aggregation data unit count) is satisfied; or 3) a timeout is satisfied (regardless of the minimum aggregation data unit count being satisfied or not). For another example, in a time-based approach, data units are aggregated during a time period determined by a minimum aggregation time until no more data units remain in the queue or the maximum aggregation threshold is satisfied.

In both examples described above, the parameters associated with the minimum aggregation requirement can be dynamically tuned based on operating conditions. For example, in the count-based approach described above, when the timeout is determined, the minimum aggregation data unit count can be dynamically tuned based on a link rate associated with a mobile communication device. Thus, a stronger link (e.g., a higher link rate) can use less time to transmit an aggregated data unit of a fixed size, or can transmit a larger aggregated data unit within a given time.

After the parameters of an aggregation setting are determined at the aggregation-tuning module 220, the aggregation-tuning module 220 can be configured to send the parameters to the aggregation module 250 of the access point 200 via a signal 257 as shown in FIG. 2. As a result, the aggregation module 250 can be configured to implement data unit aggregation based on the aggregation setting including the parameters. Specifically, the aggregation module 250 can be configured to aggregate data units into aggregated data unit(s) using the parameters. Then the access point 200 can be configured to send the aggregated data unit(s) to one or more associated mobile communication devices.

In some embodiments, the aggregation-tuning module 220 can be configured to send the parameters to the mobile communication device(s) that are associated with the aggregation setting via a signal 259 as shown in FIG. 2. For example, the access point 200 and a mobile communication device (not shown in FIG. 2) can be configured to implement a proprietary protocol such that the access point 200 can send a signal having an indication of the parameters to that mobile communication device. As a result, the aggregation setting including the parameters can be implemented, at the associated mobile communication device(s), in aggregating data units sent from the associated mobile communication device(s) to the access point 200.

In some embodiments, the aggregation-tuning module 220 can be configured to dynamically execute the self-tuning process associated with aggregating data units for data transmissions between the access point 200 and the associated mobile communication device(s). In such embodiments, the input module 210 is configured to continuously or repeatedly collect and/or receive values of the metrics that are associated with data unit aggregation. The input module 210 is also configured to receive any update in the goal of data unit aggregation, thus to continuously or repeatedly update weights for the metrics. In response to any change in the values and/or weights for the set of metrics, the aggregation-tuning module 220 is configured to update parameters for the aggregation setting. As a result, implementation of data unit aggregation can be updated timely at the access point 200 (at the aggregation module 250) and associated mobile communication device(s).

In some embodiments, in a process of data unit aggregation at the access point 200 or a mobile communication device operatively coupled to the access point 200, the access point 200 or the mobile communication device need not produce an aggregated data unit as soon as the minimum aggregation data unit size and/or the minimum aggregation data unit count are reached by the queued data units. Instead, the access point 200 or the mobile communication device can wait a predetermined period of time and then aggregate the data units that are queued during the period of time to form an aggregated data unit, if the formed aggregated data unit satisfies the aggregation setting (e.g., the maximum/minimum aggregation data unit size, the maximum/minimum aggregation data unit count). On the other hand, if the aggregated data unit that is hypothetically aggregated from the data units queued during the period of time does not satisfy the aggregation setting, the period of time can be adjusted (e.g., extended, shortened) accordingly.

For example, if an aggregated data unit aggregated from data units queued during a predetermined period of time falls short from a specified minimum aggregation data unit size and/or minimum aggregation data unit count, the predetermined period of time can be extended accordingly. Thus, an aggregated data unit aggregated from data units queued during an extended period of time is more likely to satisfy the specified minimum aggregation data unit size and/or minimum aggregation data unit count. For another example, similarly, if an aggregated data unit aggregated from data units queued during a predetermined period of time exceeds a specified maximum aggregation data unit size and/or maximum aggregation data unit count, the predetermined period of time can be shortened accordingly. Thus, an aggregated data unit aggregated from data units queued during a shortened period of time is more likely to satisfy the specified maximum aggregation data unit size and/or maximum aggregation data unit count.

In some embodiments, parameters of an aggregation setting can be determined at the aggregation-tuning module 220 such that a desired goal of data unit aggregation can be achieved for one or more specific mobile communication devices and/or services. For example, if fairness among mobile communication devices is the goal for data unit aggregation, the parameter of the aggregation setting can be tuned at the aggregation-tuning module 220 such that each mobile communication device can have a relatively fair amount of medium usage (e.g., a fair amount of time to occupy a specific bandwidth of a channel shared by the multiple mobile communication devices at different times, a fair amount of bandwidth of a channel allocated to each mobile communication device at a given time, etc.) regardless of the operating conditions (e.g., link rate) of the mobile communication devices. Specifically, each associated mobile communication device can be assigned, for example, an equal minimum aggregation data unit size, an equal minimum aggregation data unit count, an equal maximum aggregation data unit size, and/or an equal maximum aggregation data unit count.

For another example, if improving overall throughput of data transmitted from and/or received at the access point 200 is the goal for data unit aggregation, the parameters of the aggregation setting can be tuned at the aggregation-tuning module 220 such that an associated mobile communication device with a strong link rate can have precedence of medium usage over associated mobile communication device(s) with a poor link rate. As described above, the associated mobile communication device with a strong link rate uses less time to transmit an aggregated data unit of a fixed size than the associated mobile communication device with a poor link rate. Thus, the associated mobile communication device with a strong link rate can be assigned a minimum aggregation data unit count (or a minimum aggregation data unit size) that is larger than a minimum aggregation data unit count (or a minimum aggregation data unit size) assigned to the associated mobile communication device with a poor link rate. Meanwhile, the associated mobile communication device with a strong link rate can also be assigned a maximum aggregation data unit count (or a maximum aggregation data unit size) that is larger than a maximum aggregation data unit count (or a maximum aggregation data unit size) assigned to the associated mobile communication device(s) with a poor link rate. As a result, given the same incoming data streams to the two mobile communication devices, the mobile communication device with a strong link rate can aggregate data units quicker, thus forming more aggregated data units, than the mobile communication device with a poor link rate.

In some embodiments, the access point 200 can be operatively coupled to and communicate with a single mobile communication device. In such embodiments, the aggregation-tuning module 220 can be configured to tune parameters of the aggregation setting associated with data transmissions between the access point 200 and the single mobile communication device mainly based on values and weights for the metrics associated with the single mobile communication device such as, for example, an ingress data unit rate, a data unit error rate, and/or the like.

For example, when the ingress data unit rate is relatively low, in the count-based approach described above the aggregation-tuning module 220 can be configured to decrease the minimum aggregation data unit size, the minimum aggregation data unit count and/or the minimum aggregation time, or implement the timeout mechanism, such that the access point 200 can have a better chance to meet the minimum aggregation requirement with the constraint of a latency requirement (e.g., a COS latency requirement). On the other hand, in the time-based approach described above, the aggregation-tuning module 220 can be configured to increase the minimum aggregation time (as long as it complies with any related requirement or standard (e.g., latency requirement, service requirement)), such that the access point 200 can wait a longer period of time (i.e., the predetermined period of time for data unit aggregation is extended) to have a larger aggregated data unit. As a result, channel utilization can be improved and the medium can be used more effectively.

For another example, when the ingress data rate is relatively high, in the count-based approach described above the aggregation-tuning module 220 can be configured to increase the minimum aggregation data unit size/count and/or the maximum aggregation data unit size/count (as long as it complies with any requirement or standard (e.g., latency requirement, service requirement)), such that the access point 200 can construct a larger aggregated data unit. If the packet error rate and/or retry count increase, however, the aggregation-tuning module 220 can be configured to decrease the maximum aggregation data unit size/count and/or the minimum aggregation data unit size/count to reduce the chance of data unit corruption in transmitting large aggregated data units. As a result, excessive retries due to a high data unit corruption rate caused by transmissions of large aggregated data units can be avoided, and thus the performance of the data transmission can be improved.

In some other embodiments, the access point 200 can be operatively coupled to and communicate with multiple mobile communication devices that are associated with a common COS. In such embodiments, the aggregation-tuning module 220 can be configured to tune parameters of the aggregation setting mainly based on values and weights for the metrics associated with the common COS and the multiple mobile communication devices such as, for example, a service quality, a service goal (e.g. throughput or fairness), traffic conditions, etc.

In yet some other embodiments, the access point 200 can be operatively coupled to and communicate with multiple mobile communication devices that are associated with various COSs. In such embodiments, the aggregation-tuning module 220 can be configured to tune parameters of the aggregation setting mainly based on values and weights for the metrics associated with the various COSs and the multiple mobile communication devices such as, for example, mechanisms to prioritize the different COSs, service qualities, service goals, etc. As a result, for example, a high priority service can have precedence of medium usage without being blocked by long transmissions of aggregated data units of low priority services.

Figure 3:
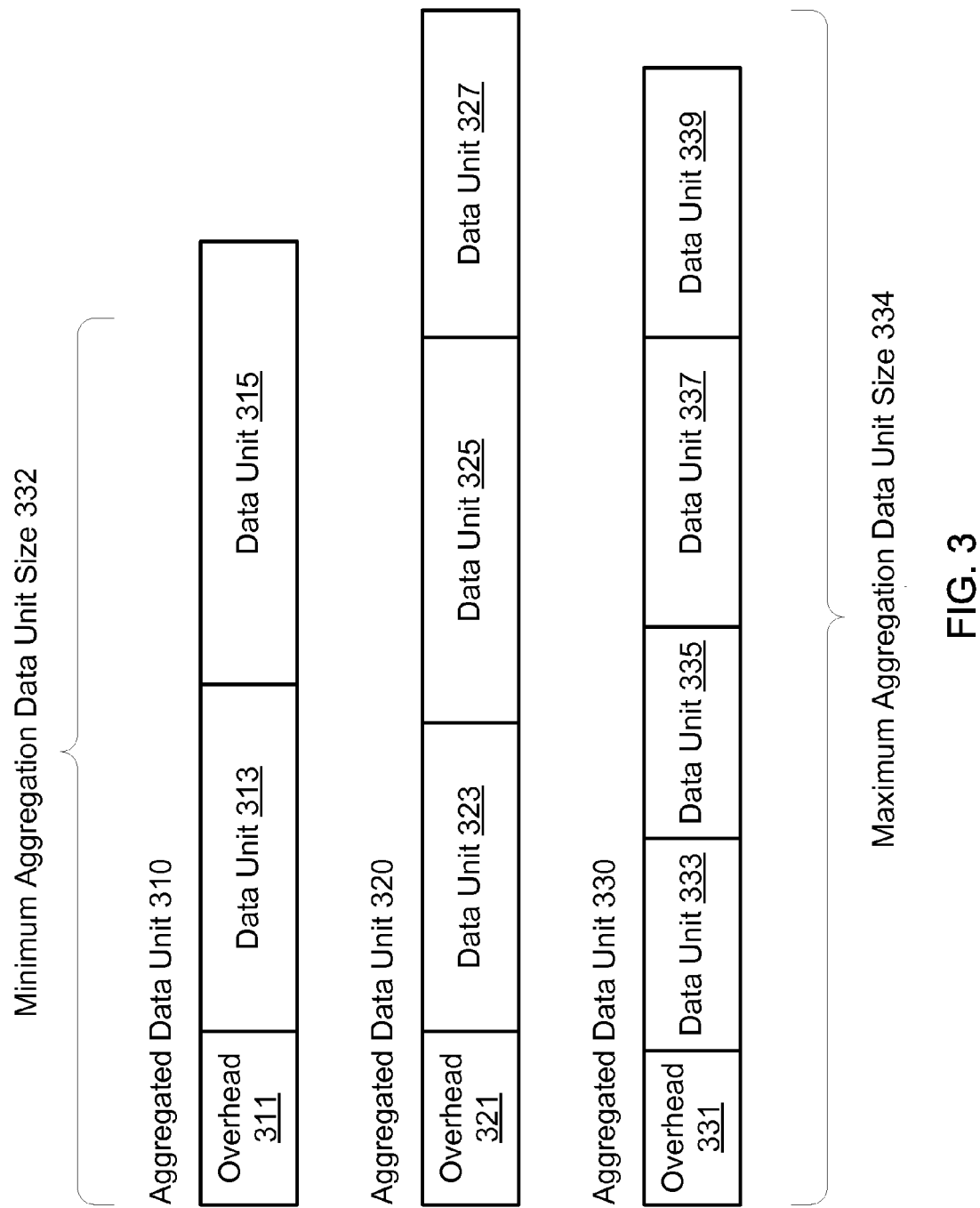
FIG. 3 is a schematic illustration of aggregated data units transmitted between an access point and a mobile communication device, according to an embodiment.

FIG. 3 is a schematic illustration of aggregated data units 310, 320 and 330 transmitted between an access point and a mobile communication device, according to an embodiment. The aggregated data units 310, 320 and 330 can be formed at the access point or at the mobile communication device. The access point can be similar to the access point 110 shown and described with respect to FIG. 1 and the access point 200 shown and described with respect to FIG. 2. The mobile communication device can be operatively coupled to the access point, and similar to the mobile communication devices 122, 124 and 126 shown and described with respect to FIG. 1.

In some embodiments, one or more parameters of an aggregation setting (e.g., the maximum aggregation data unit size, the maximum aggregation data unit count, the minimum aggregation data unit size, the minimum aggregation data unit count, the maximum transmission time, etc.) can be defined by a standard such as, for example, the IEEE 802.11n protocol or any other suitable protocol. As described above with respect to FIG. 2, the values of such parameters can be determined by a self-tuning process executed at the access point.

As shown in FIG. 3, the aggregated data unit 310 is aggregated from data units 313 and 315; the aggregated data unit 320 is aggregated from data units 323, 325 and 327; the aggregated data unit 330 is aggregated from data units 333, 335, 337 and 339. The aggregation setting that is used to generate the aggregated data units 310, 320 and 330 includes a minimum aggregation data unit size 332, a maximum aggregation data unit size 334, a minimum aggregation data unit count (e.g., 2), and a maximum aggregation data unit count (e.g., 4). As shown in FIG. 3, the aggregated data units 310, 320 and 330 all have a length (e.g., in bits) between (including the boundaries) the minimum aggregation data unit size 332 and the maximum aggregation data unit size 334, and all include a number of data units that is between the minimum aggregation data unit count (e.g., 2) and the maximum aggregation data unit count (e.g., 4).

In some embodiments, when multiple data units are aggregated to form an aggregated data unit, the multiple data units can be wrapped in, for example, a payload portion of the aggregated data unit. Meanwhile, overhead associated with each data unit can be combined to form a single overhead for the aggregated data unit, which can be included in, for example, a header portion of the aggregated data unit. The overhead of the aggregated data unit can include management information associated with each data unit included in the aggregated data unit such as, for example, headers, MAC frame fields, interframe spacing, acknowledgement of transmitted data units, and/or the like. In the example of FIG. 3, the aggregated data unit 310 includes an overhead portion 311 that contains management information associated with the data units 313 and 315; the aggregated data unit 320 includes an overhead portion 321 that contains management information associated with the data units 323, 325 and 327; the aggregated data unit 330 includes an overhead portion 331 that contains management information associated with the data units 333, 335, 337 and 339.

Figure 4:
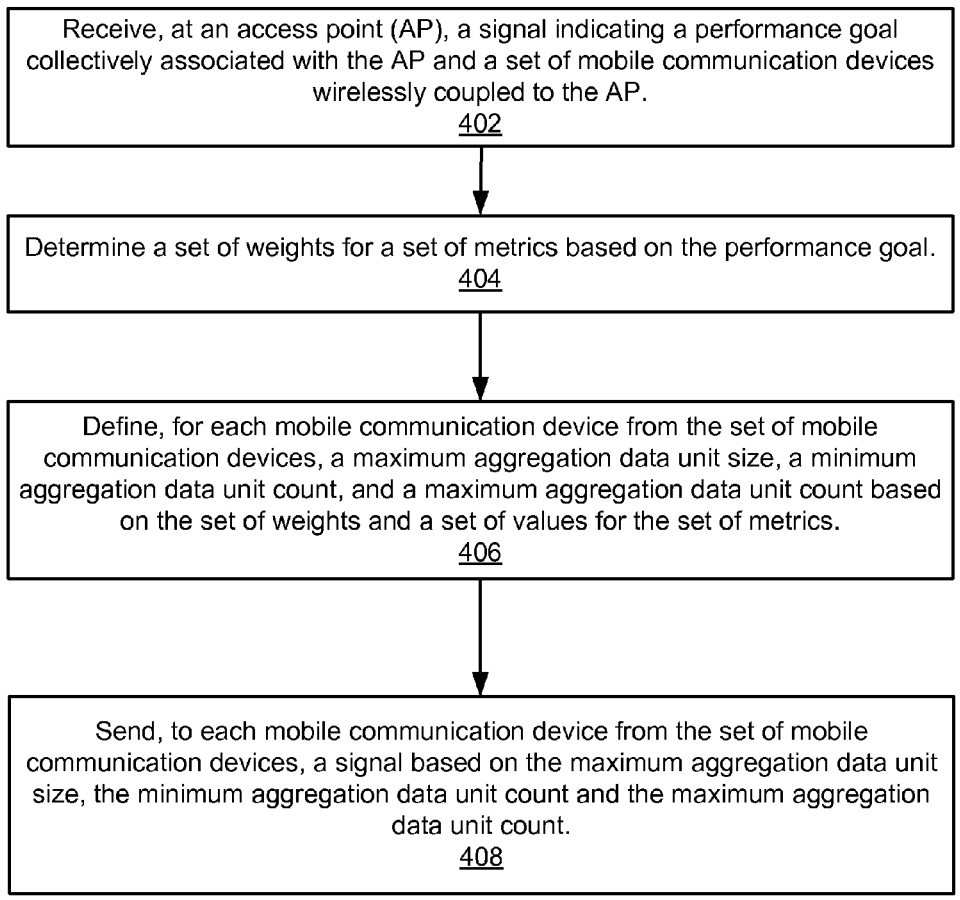
FIG. 4 is a flow chart illustrating a method of self-tuning data unit aggregations, according to an embodiment.

FIG. 4 is a flow chart illustrating a method 400 of self-tuning data unit aggregations, according to an embodiment. The method 400 can be executed, for example, at an access point that is structurally and functionally similar to the access point 200 shown and described with respect to FIG. 2. The access point can be wirelessly coupled to a set of mobile communication devices, which are similar to the mobile communication device(s) 120 shown and described with respect to FIG. 1. Instructions associated with the method 400 can be stored, for example, in a memory of the access point (similar to the memory 230 of the access point 200) and executed by a processor of the access point (similar to the processor 240 of the access point 200). Similar to the access point 200, the access point can have one or more modules (e.g., an input module, an aggregation-tuning module, an aggregation module) configured to collectively perform functions associated with the method 400, as described below.

The access point can be configured to receive a signal indicating a performance goal collectively associated with the access point and the set of mobile communication devices, at 402. In some embodiments, such a signal indicating a performance goal can be received at, for example, an input module of the access point from a user device used by a user of the access point (e.g., a network administrator, a network operator). The performance goal can be, for example, to enhance fairness among the set of mobile communication devices, to improve overall throughput of transmitted data, to maximize performance of a particular mobile communication device, etc.

The access point can be configured to determine a set of weights for a set of metrics based on the performance goal, at 404. In some embodiments, the set of metrics can include, for example, one or more of a link rate, an ingress data unit rate, a service load, a service type, a service quality, a number of available block acknowledgment slots, a resource availability, etc. The weight determined for each metric can indicate the importance or priority of that metric compared with other metrics with respect to the self-tuning process. In some embodiments, each performance goal is associated with a distinct set of weights, as described in detail with respect to FIG. 2.

The access point can be configured to define one or more parameters of an aggregation setting for each mobile communication device from the set of communication devices, at 406. The parameters of the aggregation setting can be determined at, for example, an aggregation-tuning module of the access point based on the set of weights and a set of values of the set of metrics. The set of weights can be received at the aggregation-tuning module from the input module. Values from the set of values of the set of metrics can be determined at other modules or components of the access point or received from other devices (e.g., the set of mobile communication devices) operatively coupled to the access point. In some embodiments, the parameters of the aggregation setting that are determined at the aggregation-tuning module can include, for example, one or more of a maximum aggregation data unit size, a minimum aggregation data unit size, a maximum aggregation data unit count, a minimum aggregation data unit count, etc.

After the parameters of the aggregation setting are determined, the access point can be configured to implement data unit aggregations according to the parameters of the aggregation setting for each mobile communication device, and then send the aggregated data unit(s) to each mobile communication device accordingly, at 408. In some embodiments, the access point can be configured to implement data unit aggregations at, for example, an aggregation module of the access point according to the parameters. In some embodiments, the access point can be configured to send (e.g., based on a proprietary protocol between the access point and a mobile communication device) a signal including indications of the parameters to a mobile communication device from the set of communication devices. As a result, that mobile communication device can implement data unit aggregations according to the parameters of the aggregation setting.

Furthermore, the access point can be configured to monitor the values of the metrics and the weights for the metrics (or equivalently, the performance goal). In response to detecting any change in the values of the metrics and/or the weights for the metrics, the access point can be configured to execute the method 400 (or a portion of the method 400) again to modify the parameters of the aggregation setting accordingly. Thus, data unit aggregations associated with data transmissions between the access point and the set of mobile communication devices can be self-tuned.

While shown and described above with respect to FIGS. 1, 2 and 4 as the self-tuning process for data unit aggregation being implemented in wireless communication sessions between an access point and mobile communication device(s), in other embodiments, such a self-tuning process for data unit aggregation can be implemented in a similar way in wired communication sessions between, for example, a server device and one or more client devices. In such embodiments, the client devices can be operatively coupled to the server device via a common medium (e.g., a shared cable). Similar to the self-tuning process described herein, parameters associated with data unit aggregation can be dynamically tuned at the server device and data unit aggregation can be operated based on the dynamically-tuned parameters at the server device and the client devices.

While shown and described above with respect to FIGS. 1, 2 and 4 as the self-tuning process for data unit aggregation being implemented at access points, in other embodiments, a similar self-tuning process for data unit aggregation can be implemented at other devices such as, for example, mobile communication devices. In such embodiments, a mobile communication device can include an aggregation-tuning module (similar to the aggregation-tuning module 220 shown and described with respect to FIG. 2) configured to execute the self-tuning process to determine parameters for an aggregation setting. The mobile communication device can then implement data unit aggregation using the parameters of the aggregation setting. Furthermore, the mobile communication device can send (e.g., based on a proprietary protocol) the parameters to other devices (e.g., an access point) such that the aggregation setting can be implemented at the other devices.

Some embodiments described herein relate to devices (e.g., access points, mobile communication devices) with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
an access point (AP) configured to be wirelessly coupled to a plurality of mobile communication devices, the AP configured to send to or receive from one mobile communication device from the plurality of mobile communication devices during a time period and not send to or receive from the remaining mobile communication devices from the plurality of mobile communication devices during the time period,
the AP configured to determine a plurality of weights for a plurality of metrics based on a performance goal collectively associated with the AP and the plurality of mobile communication devices;

the AP configured to define, for each mobile communication device from the plurality of mobile communication devices, a maximum aggregation data unit size, a minimum aggregation data unit count, and a maximum aggregation data unit count based on the plurality of weights and a plurality of values for the plurality of metrics; and the AP configured to send, to each mobile communication device from the plurality of mobile communication devices, a signal based on the maximum aggregation data unit size, the minimum aggregation data unit count and the maximum aggregation data unit count for that mobile communication device.

2. The apparatus of claim 1, wherein the AP is configured to send the signal such that each mobile communication device from the plurality of mobile communication devices receives from the AP according to the 802.11n protocol based on the maximum aggregation data unit size, the minimum aggregation data unit count and the maximum aggregation data unit count.

3. The apparatus of claim 1, wherein:
the plurality of weights is a first plurality of weights, the maximum aggregation data unit size is a first maximum aggregation data unit size, the minimum aggregation data unit count is a first minimum aggregation data unit count, the maximum aggregation data unit count is a first maximum aggregation data unit count,
the AP is configured to define a second maximum aggregation data unit size, a second minimum aggregation data unit count and a second maximum aggregation data unit count based on a second plurality of weights and the plurality of values for the plurality of metrics,
the AP is configured to send a signal based on the second maximum aggregation data unit size, the second minimum aggregation data unit count and the second maximum aggregation data unit count.

4. The apparatus of claim 1, wherein:
the plurality of values is a first plurality of values, the maximum aggregation data unit size is a first maximum aggregation data unit size, the minimum aggregation, data unit count is a first minimum aggregation data unit count, the maximum aggregation data unit count is a first maximum aggregation data unit count,
the AP is configured to define a second maximum aggregation data unit size, a second minimum aggregation data unit count and a second maximum aggregation data unit count based on the plurality of weights and a second plurality of values for the plurality of metrics,
the AP is configured to send a signal based on the second maximum aggregation data unit size, the second minimum aggregation data unit count and the second maximum aggregation data unit count.

5. The apparatus of claim 1, wherein the plurality of metrics include at least one of a link rate for a mobile communication device from the plurality of mobile communication devices, an ingress data unit rate at the AP, a service load for the plurality of mobile communication devices, a service type of a data unit sent from or received by the AP, a service quality of a data unit sent from or received by the AP, a number of available block acknowledgment slots, or a resource availability for a mobile communication device from the plurality of mobile communication devices.

6. The apparatus of claim 1, wherein:
the AP is configured to receive a signal from each mobile communication device from the plurality of mobile communication devices based on the maximum aggregation data unit size for that mobile communication device, the minimum aggregation data unit count for that mobile communication device and the maximum aggregation data unit count for that mobile communication device, the AP is configured to receive the signal from each mobile communication device from the plurality of mobile communication devices in a time period mutually exclusive from receiving the signals from the remaining mobile communication devices from the plurality of mobile communication devices.

7. An apparatus, comprising:
an access point (AP) configured to be wirelessly coupled to a plurality of mobile communication devices including a first mobile communication device, the AP configured to send to or receive from one mobile communication device from the plurality of mobile communication devices during a time period and not send to or receive from the remaining mobile communication devices from the plurality of mobile communication devices during the time period,
the AP configured to determine (1) a maximum aggregation data unit size for the first mobile communication device, (2) a minimum aggregation data unit count for the first mobile communication device and (3) a maximum aggregation data unit count for the first mobile communication device, based on a plurality of weights for a plurality of metrics and a plurality of values for the plurality of metrics, the plurality of weights for the plurality of metrics determined based on a performance goal; and
the AP configured to send to the first mobile communication device a signal based on the maximum aggregation data unit size, the minimum aggregation data unit count and the maximum aggregation data unit count.

8. The apparatus of claim 7, wherein the AP is configured to send the signal such that the first mobile communication device receives from the AP according to the 802.11n protocol based on the maximum aggregation data unit size, the minimum aggregation data unit count and the maximum aggregation data unit count.

9. The apparatus of claim 7, wherein:
the signal is a first signal; and
the AP is configured to receive from the first mobile communication device, after sending the first signal, a second signal based on the maximum aggregation data unit size, the minimum aggregation data unit count and the maximum aggregation data unit count.

10. The apparatus of claim 7, wherein the AP is configured to dynamically determine the maximum aggregation data unit size for the first mobile communication device, the minimum aggregation data unit count for the first mobile communication device and the maximum aggregation data unit count for the first mobile communication device in response to changes in at least one of the plurality of weights and the plurality of values.

11. The apparatus of claim 7, wherein:
the maximum aggregation data unit size, the minimum aggregation data unit count and the maximum aggregation data unit count are associated with the first mobile communication device;
the AP is configured to define, for each remaining mobile communication device from the plurality of mobile communication devices, a maximum aggregation data unit size, a minimum aggregation data unit count and a maximum aggregation data unit count based on the plurality of weights and the plurality of values for the plurality of metrics; and the AP is configured to send a signal to each mobile communication device from the plurality of mobile communication devices based on the maximum aggregation data unit size for that mobile communication device, the minimum aggregation data unit count for that mobile communication device and the maximum aggregation data unit count for that mobile communication device.

12. The apparatus of claim 7, wherein:
the maximum aggregation data unit size, the minimum aggregation data unit count and the maximum aggregation data unit count are associated with the first mobile communication device; and
the AP is configured to send a signal to each mobile communication device from the plurality of mobile communication devices based on a maximum aggregation data unit size for that mobile communication device, a minimum aggregation data unit count for that mobile communication device and a maximum aggregation data unit count for that mobile communication device, the AP is configured to send the signal to each mobile communication device from the plurality of mobile communication devices in a time period mutually exclusive from sending the signals to the remaining mobile communication devices from the plurality of mobile communication devices.

13. An apparatus, comprising:
an access point (AP) configured to wirelessly send to or receive from a plurality of mobile communication devices,
the AP configured to determine (1) a maximum aggregation data unit size for a first mobile communication device from the plurality of mobile communication devices, (2) a minimum aggregation data unit count for the first mobile communication device and (3) a maximum aggregation data unit count for the first mobile communication device, based on a plurality of weights for a plurality of metrics and a plurality of values for the plurality of metrics, the plurality of weights for the plurality of metrics determined based on a performance; and
the AP configured to send a signal to the first mobile communication device based on the maximum aggregation data unit size, the minimum aggregation data unit count and the maximum aggregation data unit count.

14. The apparatus of claim 13, wherein the AP is configured to send to the first mobile communication device according to the 802.11n protocol based on the maximum aggregation data unit size, the minimum aggregation data unit count and the maximum aggregation data unit count.

15. The apparatus of claim 13, wherein:
the signal is a first signal; and
the AP is configured to send to the first mobile communication device a second signal having an indication of the maximum aggregation data unit size, an indication of the minimum aggregation data unit count and an indication of the maximum aggregation data unit count.

16. The apparatus of claim 13, wherein the AP is configured to dynamically determine the maximum aggregation data unit size for the first mobile communication device, the minimum aggregation data unit count for the first mobile communication device and the maximum aggregation data unit count for the first mobile communication device, in response to changes in at least one of the plurality of weights and the plurality of values.

17. The apparatus of claim 13, wherein:
the AP is configured to receive a signal representing the performance goal, the performance goal being collectively associated with the AP and the plurality of mobile communication devices.

18. The apparatus of claim 13, wherein:
the plurality of weights is a first plurality of weights, the maximum aggregation data unit size is a first maximum aggregation data unit size, the minimum aggregation data unit count is a first minimum aggregation data unit count, the maximum aggregation data unit count is a first maximum aggregation data unit count,
the AP is configured to determine (1) a second maximum aggregation data unit size for the first mobile communication device, (2) a second minimum aggregation data unit count for the first mobile communication device, and (3) a second maximum aggregation data unit count for the first mobile communication device, based on a second plurality of weights for the plurality of metrics and the plurality of values for the plurality of metrics,
the AP is configured to send a signal to the first mobile communication device based on the second maximum aggregation data unit size, the second minimum aggregation data unit count and the second maximum aggregation data unit count.

19. The apparatus of claim 13, wherein:
the plurality of values is a first plurality of values, the maximum aggregation data unit size is a first maximum aggregation data unit size, the minimum aggregation data unit count is a first minimum aggregation data unit count, the maximum aggregation data unit count is a first maximum aggregation data unit count,
the AP is configured to determine (1) a second maximum aggregation data unit size for the first mobile communication device, (2) a second minimum aggregation data unit count for the first mobile communication device, and (3) a second maximum aggregation data unit count for the first mobile communication device, based on the plurality of weights for the plurality of metrics and a second plurality of values for the plurality of metrics,
the AP is configured to send a signal to the first mobile communication device based on the second maximum aggregation data unit size, the second minimum aggregation data unit count and the second maximum aggregation data unit count.

20. The apparatus of claim 13, wherein:
the maximum aggregation data unit size, the minimum aggregation data unit count and the maximum aggregation data unit count are associated with the first mobile communication device;
the AP is configured to define, for each remaining mobile communication device from the plurality of mobile communication devices, a maximum aggregation data unit size, a minimum aggregation data unit count and a maximum aggregation data unit count based on the plurality of weights and the plurality of values for the plurality of metrics; and
the AP is configured to send a signal to each mobile communication device from the plurality of mobile communication devices based on the maximum aggregation data unit size for that mobile communication device, the minimum aggregation data unit count for that mobile communication device and the maximum aggregation data unit count for that mobile communication device.

\* \* \* \* \*